United States Patent

[11] 3,559,937

| [72] | Inventors | T.O. Paine<br>Deputy Administrator of the National<br>Aeronautics and Space Administration with<br>respect to an invention of;<br>Roy Broussard; Josef M. Beehm,<br>Huntsville, Ala. |
|---|---|---|
| [21] | Appl. No. | 762,956 |
| [22] | Filed | Sept. 26, 1968 |
| [45] | Patented | Feb. 2, 1971 |

[54] OPTICAL TRACKING MOUNT
4 Claims, 3 Drawing Figs.

[52] U.S. Cl. ................................................ 248/183, 308/9
[51] Int. Cl. ............................................... F16c 17/16
[50] Field of Search .......................................... 248/182, 178, 183, 179, 180, 181, 176, 185; 308/9, Air

[56] References Cited
UNITED STATES PATENTS

| 656,310 | 8/1900 | Warburton | 308/9 |
| 2,326,552 | 8/1943 | Morse | 248/183 |
| 2,617,695 | 11/1952 | Tauscher et al. | 308/9 |
| 2,644,727 | 7/1953 | Tauscher et al. | 308/9 |
| 2,915,902 | 12/1959 | Brugger | 308/9 |
| 2,981,572 | 4/1961 | Kuhne | 308/9 |
| 3,016,273 | 1/1962 | Benoit | 308/A |
| 3,193,334 | 7/1965 | Porath | 308/9 |
| 3,438,684 | 4/1969 | Kruger | 308/9 |

*Primary Examiner*—Marion Parsons, Jr.
*Attorneys*—L. D. Wofford, Jr., C. Wells and G. T. McCoy

ABSTRACT: A tracking mount for a laser telescope having a rotatable base, a yoke mounted on the base and a bracket mounted for rotation in the yoke. The bracket mounts the telescope and is supported in the yoke by two spherical air bearings. Each air bearing includes a spherical journal attached to the mounting bracket and upper and lower spherical bearing members in which the journal rotates. The bearing members of one air bearing are fixed to the yoke and the bearing members of the other air bearing are moveably mounted on the yoke by a flexure joint.

JOSEF M. BOEHM
M. ROY BROUSSARD
INVENTORS

JOSEF M. BOEHM
M. ROY BROUSSARD
INVENTORS

JOSEF M. BOEHM
M. ROY BROUSSARD
INVENTORS 3,559,937

OPTICAL TRACKING MOUNT

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The tracking of large rockets and space vehicles both during launch to check their alignment relative to the launch tower, and during flight to determine exact positioning, range and velocity, is very important. Tracking systems have become highly sophisticated employing advanced electronic circuitry and with the use of laser devices, like laser telescopes, very accurate measurements of such things as range and velocity can be made. However, information as to azimuth and elevation must be obtained from the tracking mount. Thus the tracking must be smooth and error free to take full advantage of the accuracy capability of the laser and associated electronics.

In tracking mounts in general there is movement about a vertical axis to alter the azimuthal direction of the device being positioned, whether it be a laser telescope, a gun, rocket launcher or scientific instrument; and also movement of the device about an elevation (horizontal) axis. The mechanical apparatus providing changes in azimuth has not presented a problem and desired accuracy has been obtainable. However, sufficiently accurate movements about the elevation axis have not been possible in prior trackers because of friction and other forces due to such things as minute deflections of the mount due to changes in the loading and thermal expansion in the direction of the elevation axis. This lack of accuracy has been due, in part at least, to the type of bearing used and manner of installation of such bearings.

SUMMARY OF THE INVENTION

The present invention is a tracking mount for a laser telescope which overcomes many of the characteristic disadvantages of prior art mounts and provides for maintaining the direction of the main optical plane of the telescope during 360° elevation rotation to better than one arc-second accuracy. The mount includes a base, a yoke mounted on the base, and a rigid mounting bracket for the telescope supported in the yoke with spherical air bearing. The improved characteristics of the invention are obtained because the mount provides an extremely rigid elevation axis which is highly symmetrically shaped about the vertical optical plane of the telescope. The structure which defines or results in this rigid elevation axis includes the rigid mounting bracket and two rigidly attached spheres which are the journals of the supporting air bearings, and upper captive spherical cups which center the air bearings spheres relative to the air bearing gap. One of the air bearings is fixed to the yoke whereas the other air bearing is attached to the yoke by a flexure joint which is very rigid in a vertical direction, but readily permits movement of the air bearing in a horizontal direction. The spherical air bearings used to mount the mounting bracket have self-aligning characteristics which make it possible to tolerate deflection or bending of a loaded mounting bracket without the binding that would occur if, for example, cylindrical air bearings were used. Also, by mounting one of the air bearings on a flexure, axial thrust loads on the bearings due to temperature variations are prevented. Further, by making those parts of the mount that rotate in elevation highly symmetrical about the vertical axis of the overall mount, any deflection of these rotating parts, that occurs because of loading, i.e., a heavy telescope, will be the same on both sides of the vertical axis. Thus the vertical or main optical plane of any telescope mounted on the mounting bracket will not be tilted, but will remain vertical even in the presence of mount deflection.

DESCRIPTION OF THE PREFERRED EMBODIMENT

Figure 1:
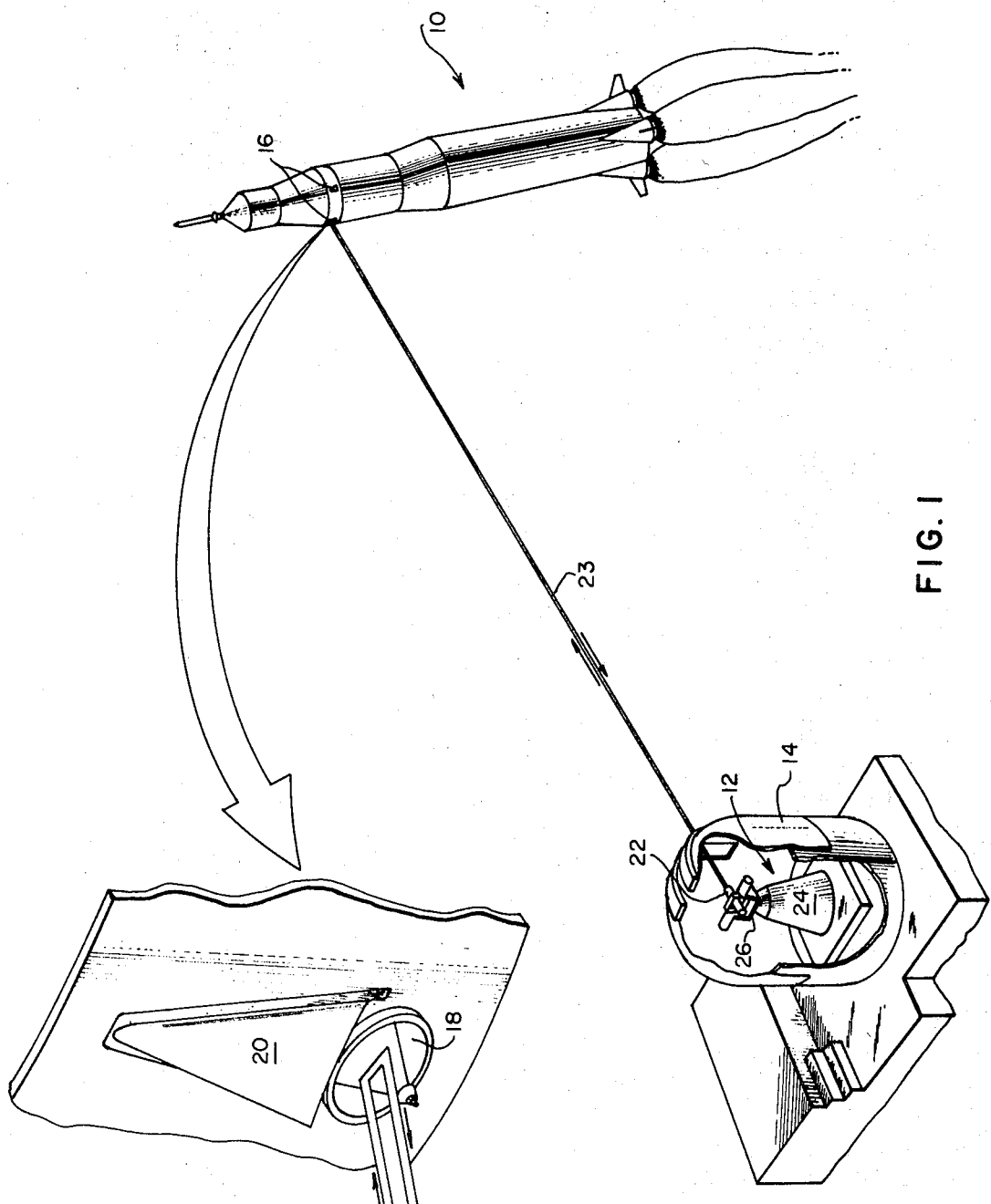
FIG. 1 is a pictorial representation of how the invention will be used to track a rocket.

Referring now to FIG. 1 of the drawings where an ascending rocket 10 is shown being tracked by an optical tracker device 12 housed in an observation dome 14. The observation dome would normally be located in the vicinity of the launching area so that the rocket could be tracked during lift off to check alignment of the rocket with respect to a launch tower as well as tracked during ascent.

The rocket has a number of corner reflectors 16 mounted around the periphery thereof that include reflecting mirrors 18 and fairing assemblies 20. The fairings protect the mirrors and provide surface contours that reduce air drag to a minimum. A modulated laser beam is piped through the tracker device to a telescope 22 which directs laser beam 23 to a corner reflector on the rocket which reflects the laser beam back to the telescope. Various information can be obtained from the reflected beam, range and velocity figures being examples of possible measurements that can be taken. The laser electronics are capable of providing very high accuracy measurements, but must depend upon the mount for azimuth and elevation information. Thus, in order to utilize the accuracy of the laser and associated electronics it is necessary that the tracker give information as to azimuth and elevation that is equally as good.

Figure 2:
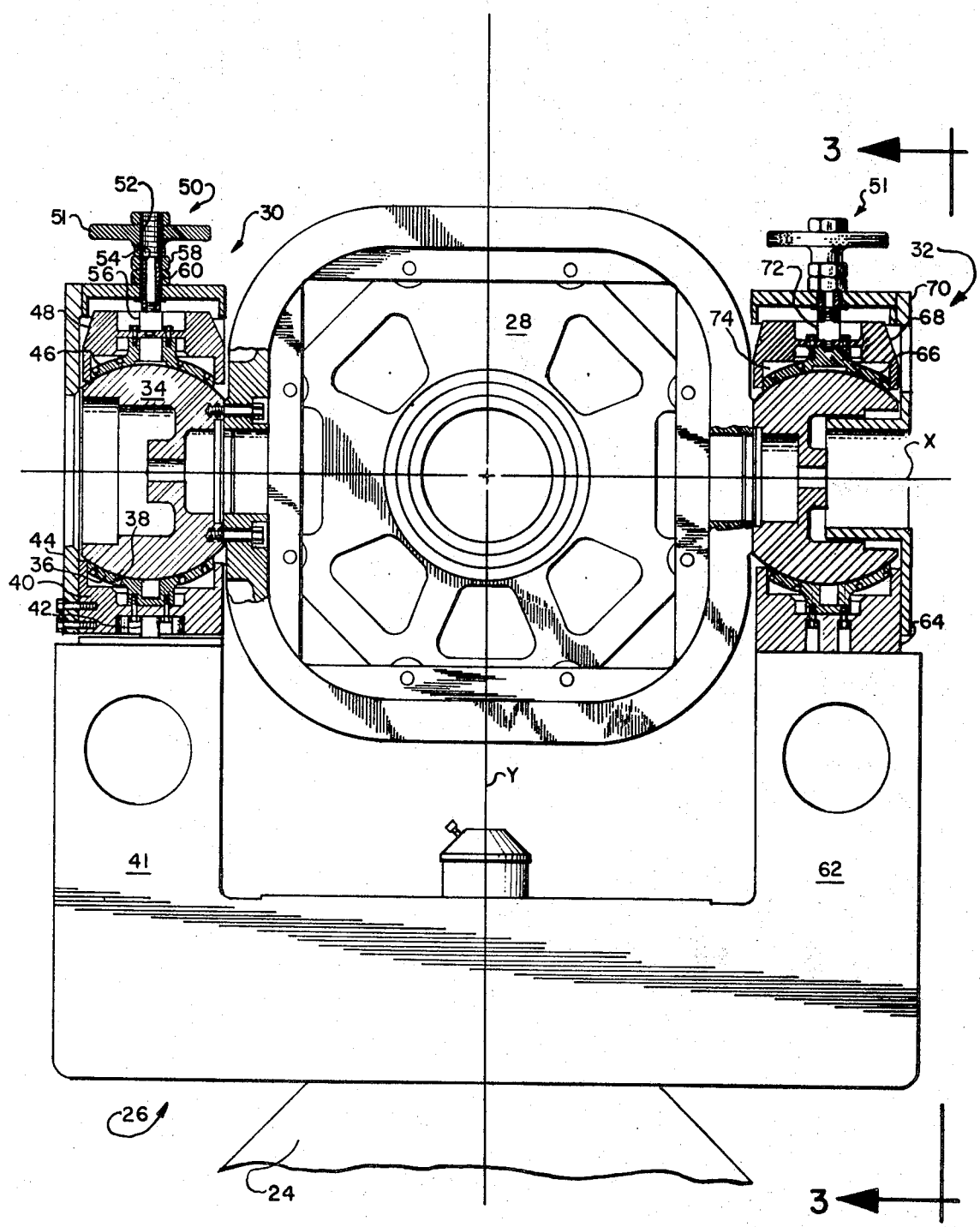
FIG. 2 is a partially cross-sectioned and broken away view of the mount.
Figure 3:
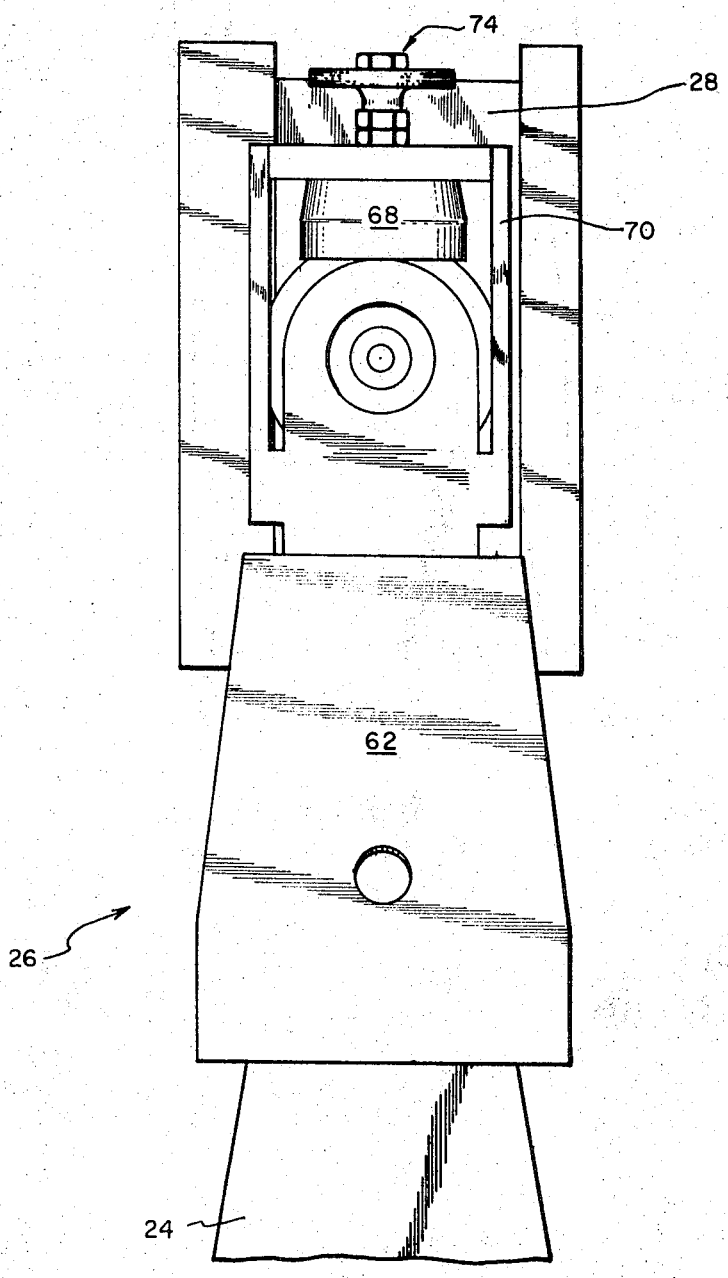
FIG. 3 is a side view along lines 3—3 of FIG. 2.

The tracking mount disclosed in FIG. 2 is capable of such accuracy. The mount includes a base 24 that is rotatable about axis Y so as to change the azimuth direction of the mount. The base rotates on an air bearing (not shown) to reduce friction. Obtaining sufficient accuracy in that part of the mount accomplishing azimuth changes, the base in this instance, has been possible heretofore so conventional construction has been utilized in the base of the mount. Hence the base is not shown in any detail herein.

A yoke 26 is mounted on the base for rotation therewith about the Y axis. A mounting bracket 28 on which the laser telescope is to be mounted is supported for rotation about axis X by two spherical air bearings 30 and 32. A laser beam will be piped through the base and yoke Y with conventional reflecting optical devices (not shown) mounted in appropriate places, and through the hollow center of one of the air bearings (32 in this particular mount) to the telescope normally mounted on bracket 28. The optical devices used with the mount are not shown because they will vary with different designs or even be omitted if the mount were used, for example, as a gun mount. However, if a telescope were mounted on bracket 28, axis Y would fall in the main optical plane of such a telescope and this main optical plane would be perpendicular to the X axis.

Air bearing 30 consists of a spherical journal 34 bolted to the mounting bracket. Spherical journal 34 is supported by a lower bearing cup 36 having a plurality of apertures 38 through which air flows to form an air cushion between the journal and bearing. Bearing 36 is bolted to a support block 40. Block 40 is attached to arm 41 of yoke 26 by three inline monoflexures 42 (only one is shown). Monoflexures are commercially available devices that function to give great rigidity in one direction (along the Y axis in the invention) and yet be flexible and permit movement in another direction (along the X axis). Flexures of the type used in the invention are available from Ormond, Inc. of Sante Fe Springs, California. The flexure permits air bearing 30 to move laterally to some extend along axis X relative to arm 41 of yoke 26.

A framework or housing 44 is bolted to block 40 and this housing extends upwardly to provide a mounting surface for an upper bearing cup 46 and a second support block 48 to which bearing cup 46 is secured. Upper bearing cup 46 and second support block 48 are adjustable relative to journal 34 by adjustment means 50 which when rotated moves bearing cup 46 and block 48 vertically.

The adjustment means includes a handwheel 51 fixed to a tube 52 which has internal and external threaded sections and is mounted for rotation (not threaded) in housing 44. A tube 54 is threaded into tube 52 and tube 54 moves vertically when handwheel 50 and tube 52 are rotated. A universal flexure device 56 that permits angular movement, but is very rigid in the vertical direction, connects tube 54 to support block 48. Flexure 56 is also a commercially available device and it is used to enhance the self alignment capabilities of the air bearing when necessary because of length changes due to temperature variations. Tube 52 has a pair of locknuts 58 and 60 mounted on an external threaded section between handwheel 51 and housing 44. These locknuts when tightened down immobilize the adjustment means.

Air bearing 32 that supports the mounting bracket on arm 62 of the yoke is almost identical to air bearing 30, differing only in that lower support block 64 is fixed to arm 62 by bolts rather than being moveably mounted on the yoke as is air bearing 30. Upper bearing cup 66 and upper support block 68 are mounted to framework 70 by a universal flexure device 72 and adjustment means 51.

The mount just described is very strong and rigid and there is very little tendency of the mount to cause the elevation axis of the mount (coincides with axis X) to deflect downwardly during loading (a heavy telescope for example). In the event such deflection does occur the self alignment capabilities of the air bearings will prevent binding. However, if the mount is not highly symmetrical about the Y axis, and also the vertical plane that would be the main optical plane of any telescope mounted on the bracket, then deflection of the mount structure due to loading could result in an unsymmetrical bending of the mount along the elevation axis (X axis) on each side of the vertical plane (Y axis) and cause a tilting or canting of the vertical plane. Therefore, those parts of the mount which rotate about the elevation axis, the mounting bracket and attached journals, are made highly symmetrical so that any deflection due to loading is the same on both sides of the vertical plane and thus the main optical plane of a mounted telescope would remain vertical.

The operation of the mount is obvious and will not be discussed in detail, but certain operational features of the invention will be described. Air is supplied to the bearings by air lines which have not been shown. Air is admitted to the manifoldlike space enclosed by the bearing cups and their respective support blocks; one such area designated by the numeral 74 is enclosed by bearing cup 66 and support block 68. The mounting bracket and attached journals are rotated in the bearing cup by commercially available brushless electric motors, often called AC torquers (not shown), which mount within the spherical journal. One component of the brushless motor being connected to the journals and the other components being attached to the supporting framework (for extensions thereof in the case of framework 44) for the two air bearings.

The spherical journals and the bearings cups have an extremely smooth surface finish which would be ruined if the journals were permitted to bear on the lower bearing cups. Thus, when it is desired to inactivate the mount it is necessary to take certain action before reducing the air pressure to the bearings. Before reducing pressure the upper bearing cups are raised vertically utilizing the adjustment mechanism handwheels and then a support member of some type is positioned between the yoke and mounting bracket to support the mounting bracket and thus hold the journals off the lower bearing cups when the air pressure thereto is reduced.

We claim:
1. A precision tracker for orienting a device mounted on the tracker comprising:
    a base means rotatable about a vertical axis for altering the azimuthal direction of the device;
    a U-shaped yoke mounted on said base for movement therewith about the vertical axis;
    a mounting bracket for the device to be oriented;
    bearing means for journaling said mounting bracket in said yoke for rotation about a horizontal elevation axis whereby the elevation of the device mounted on said mounting bracket can be changed by rotating the mounting bracket;
    said bearing means including two precision air bearings, each of said air bearings including a spherical journal connected to said mounting bracket and an upper and lower bearing member mounted on said yoke, said journal rotating in said upper and lower bearing members on a cushion of air whereby the mounting bracket is supported for rotation in said yoke without actually contacting said yoke so as to provide an almost frictionless mounting and one wherein some deflection or distortion due to loading of the mounting bracket can be tolerated because of the self alignment capabilities of the spherical air bearings;
    said mounting bracket and spherical journals attached thereto being symmetrical about a plane that coincides with said vertical axis and is perpendicular to the horizontal elevation axis, whereby any bending of the mounting bracket and attached journals due to loading will be symmetrical on both sides of this plane and therefore the angular orientation of a device mounted on the mounting bracket will not be affected by such deflection;
    means for mounting one of said air bearings to said yoke in a manner to permit horizontal movement of the air bearing relative to the yoke and along the horizontal elevation axis of the tracker whereby axial thrust loads due to temperature variations that cause changes in the length of the mount along the horizontal elevation axis will be prevented, said means for mounting one of said air bearings being a flexure joint that permits horizontal movement only and provides great rigidity in the vertical direction.

2. The tracker recited in claim 1 wherein the flexure joint is composed of a plurality of aligned monoflexures which are rigidly attached to the yoke and the lower bearing member of the laterally moveably air bearing.

3. The tracker recited in claim 2 wherein the bearing means includes:
    a supporting framework for each air bearing attached to said yoke; and
    flexible mounting means securing the upper bearing member of each air bearing to its supporting framework, whereby the upper bearing member can move to compensate for misalignment due to deflection of the journal.

4. The tracker recited in claim 3 wherein the flexible mounting means is a universal flexure that permits pivotal movement in all directions.

PO-1050
(5/69)

UNITED STATES PATENT OFFICE
CERTIFICATE OF CORRECTION

Patent No. 3,559,937  Dated Feb. 2, 1971

Inventor(s) Josef M. Boehm and M. Roy Broussard

It is certified that error appears in the above-identified patent and that said Letters Patent are hereby corrected as shown below:

On the front page, the inventors names in the bibliographic data element 72 following "respect to an invention of" should appear as M. Roy Broussard and Josef M. Boehm.

Signed and sealed this 29th day of June 1971.

(SEAL)
Attest:

EDWARD M. FLETCHER, JR.
Attesting Officer

WILLIAM E. SCHUYLER, JR.
Commissioner of Patents